United States Patent [19]

Stoerzbach

[11] Patent Number: 4,938,622
[45] Date of Patent: Jul. 3, 1990

[54] COUPLING DEVICE

[75] Inventor: Wolfram Stoerzbach, Lucerne, Switzerland

[73] Assignee: Kinematica AG, Littau, Switzerland

[21] Appl. No.: 383,052

[22] Filed: Jul. 21, 1989

[30] Foreign Application Priority Data

Jan. 25, 1989 [EP] European Pat. Off. .......... 89810064

[51] Int. Cl.⁵ .............................................. F16B 1/00
[52] U.S. Cl. ........................................ 403/2; 403/380; 403/341; 403/26
[58] Field of Search ......................... 279/75, 22, 30; 403/380, 341, 26, 286, 2

[56] References Cited

U.S. PATENT DOCUMENTS

| | | | |
|---|---|---|---|
| 685,677 | 10/1901 | Furbish | 279/22 X |
| 1,435,028 | 11/1922 | Stewart | 403/286 |
| 1,660,792 | 2/1928 | Hirth | 403/286 |
| 2,290,215 | 7/1942 | Stenberg | 279/75 U X |
| 2,618,940 | 11/1952 | Wyzenbeek . | |
| 3,398,965 | 8/1968 | Cox | 279/75 X |
| 3,540,234 | 11/1970 | Raymond . | |
| 3,545,585 | 12/1970 | Eaton, Jr. . | |
| 4,034,574 | 7/1977 | Kuder . | |

FOREIGN PATENT DOCUMENTS

| | | |
|---|---|---|
| 3401391 | 7/1985 | Fed. Rep. of Germany . |
| 1563854 | 3/1969 | France . |
| 225736 | 5/1943 | Switzerland . |
| 940527 | 10/1963 | United Kingdom . |
| 2131915 | 6/1984 | United Kingdom . |

*Primary Examiner*—Andrew V. Kundrat
*Attorney, Agent, or Firm*—Marks Murase & White

[57] ABSTRACT

A first coupling device is particularly destined for a dispersing apparatus and comprises a first coupling part having a flange and a tubular connecting piece fixed thereto, the connecting piece having at least two borings for receiving one ball each, and a concentrically surrounding, free moving ring. The diameter of the boring is slightly greater than that of the balls, but in the vicinity of the inner surface of the connecting piece, it is slightly smaller so that the balls may in part protrude into the interior of the connecting piece. The lower portion of the ring has an inner circular recess so that, when the ring is raised, the balls may travel backwards into the circular recess. The second coupling part is adapted to be introduced into said connecting piece and has circular recesses for receiving said balls.

Another coupling device for the slippage free connection of high speed rotating shafts of dispersing apparatuses comprises two coupling parts which both have six teeth whose flanks are of 60°.

Such coupling devices allow a rapid and safe coupling of dispersing equipment to dispersing apparatus without rotational or axial slippage.

9 Claims, 2 Drawing Sheets

COUPLING DEVICE

BACKGROUND OF THE INVENTION

This invention belongs to the field of mechanical engineering. It is directed to a coupling device, in particular for dispersing equipment, and comprises a first coupling part fixed to a machine such as a dispersing unit, and a second coupling part fixed to a shaft or rod to be coupled. The invention further contemplates a coupling device for the power locked or slip-free connection of rapidly rotating rods.

Dispersing apparatus for substances or substance mixtures, for example devices for the continuous kinematic high frequency treatment, are disclosed inter alia in Swiss patent specification no. 663,551 and have been manufactured and sold on a worldwide basis by the applicant since many years. In general, such apparatus comprise a basic device or unit having driving means, and a dispersing or comminuting equipment to be connected to the basic device. The equipment is formed by a hollow or tubular shaft of stainless steel whose lower end portion is shaped as a stator, and a stainless steel inner shaft rotating within said hollow shaft and whose lower end portion is shaped as a rotor. In operation, the upper end portion of both the hollow shaft and the inner shaft must be connected to the basic unit, i.e. the hollow shaft must be connected to a housing and the inner shaft to a driving means arranged within the housing.

The equipment of the prior art has a hollow or tubular shaft carrying a swivel nut which may be screwed on a corresponding thread provided at the housing of the device, and a circular joint may be provided in the interior of the swivel nut. The slip-free connection between the driving means and the rotor shaft is accomplished in the prior art by a cylinder having two grooves, fixed on the driving means, and a fork fixed to the inner shaft.

SUMMARY OF THE INVENTION

Based on this prior art, it is a first and major object of this invention to simplify the connection of the hollow shaft to the housing. Another object of the invention is to improve the slip-free connection of two high speed shafts, for example between the driving means and the rotor shaft, i.e. said inner shaft.

These objects are met by the devices of this invention.

The invention will now be explained more in detail by the description of non-limiting embodiments shown in the drawing.

BRIEF DESCRIPTION OF THE DRAWINGS

In this drawing.

DETAILED DESCRIPTION OF THE INVENTION

Figure 1:
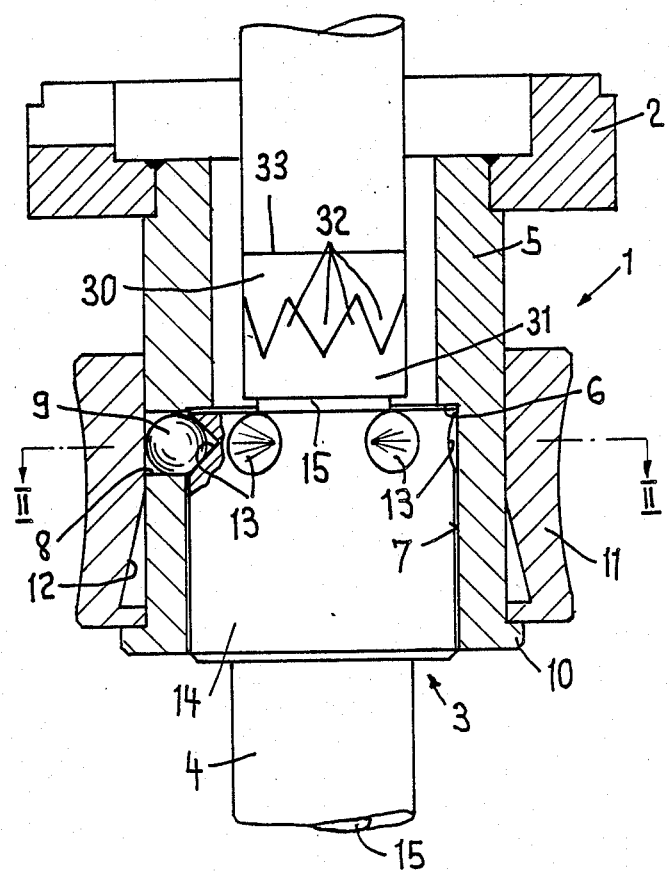
FIG. 1 shows a longitudinal section of a first embodiment of this invention.

In FIG. 1, the first coupling part 1 is shown which may be fixed by the flange 2 to the dispersing apparatus, not shown here, and the second coupling part 3 having the tubular shaft 4. In this first embodiment the first coupling part 1 comprises a cylindrical tubular connection piece 5 having a circular inner shoulder 6 followed by an exactly machined cylindrical receiving surface 7 which serves to receive the second coupling part 3.

Figure 2:
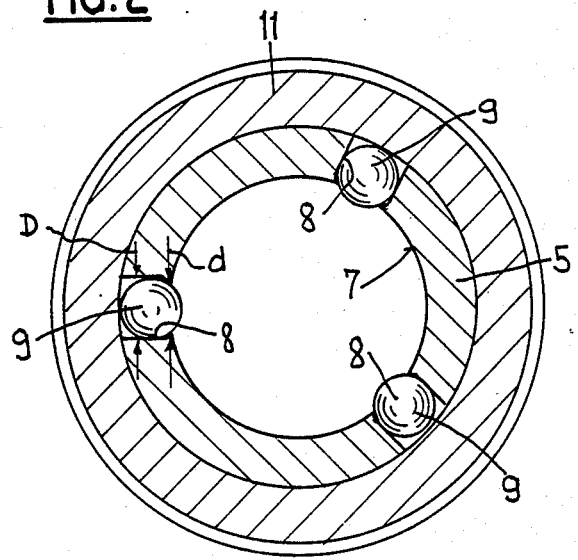
FIG. 2 is a secont along the line II—II in FIG. 1, the hollow or tubular shaft not being shown.

In the neighborhood of the shoulder 6, the cylindrical receiving surface 7 has a number of bores 8 distributed over its circumference. In the Figures, three bores 8 are shown. A ball 9 is received in each bore 8. In FIG. 2, it is shown that the bore diameter or width D is somewhat greater than the ball diameter, except in the region adjacent to the receiving surface 7 where the diameter or width d of the bore 8 is somewhat smaller than the ball diameter, in order to allow the balls 9 to be inserted from behind into the bores 8 and to protrude over the receiving surface 7, but to prevent the balls from leaving their bore ahead. The connecting piece 5 has at its free lower end portion a circular outer shoulder 10 serving as an abutment for a ring 11 which is concentric to and freely movable around the connecting piece 5. The ring 11 has a lower, inner conical surface 12 such that the balls 9 which are held in the position shown in FIG. 1 and 2 when the ring 11 is in its lower position, may slide back into the bores 9 and in abutment with the conical surface 12 when the ring 11 is raised so that the balls do not protrude from the surface 7.

The second coupling part 3 is also cylindrical and fits in with the cylindrical receiving piece formed by the surface 7. The part 3 has in its upper portion, opposite to the balls 9, a number of recesses 13 to receive a ball 9. There are six recesses 13 in this Example. In the position shown in FIG. 1, three balls 9 have entered into three recesses 13 and are prevented from leaving the recesses by the ring 11. The coupling part 3 is thereby secured in axial and in rotational direction. It should be noted that virtually no forces act upon the coupling box 14 connected to the tubular shaft 4, only the weight of the dispersing equipment acting upon the coupling device. In particular, only very small rotational forces act upon the second coupling part. The rotor shaft 15 is journalled in the second coupling part in a manner not interesting here.

As it can be seen from FIG. 1, the ring 11 which secures the balls 9 in the recesses 13, is held in position by gravitational forces only which is sufficient where the equipment is used vertically, thus in most cases. However, when the coupling device is not used with vertically arranged equipments, there is a risk for the ring 11 to leave its securing position, to liberate the balls and thus the second coupling part. In order to cancel this risk, a spring 18 (see FIG. 4) may be provided between the ring 16 and the flange 17 of the first coupling part which urges the ring into its blocking position. The spring 18 is received in a circular recess 19 of the ring 11. The remaining parts of the variant according to FIG. 4 are the same as those of FIG. 1.

Figure 5:
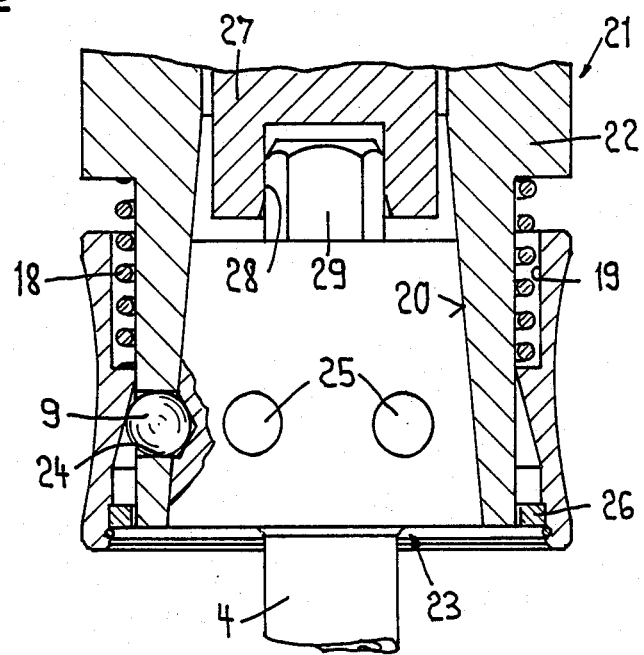
FIG. 5 is a further variant of the coupling device of this invention.

In the embodiment of FIG. 5, the inner wall 20 of the connecting piece 22 of the first coupling part 21 as well as the outer matching surface of the second coupling part 23 have a conical shape. This conical execution of both coupling parts facilitates the coupling operation but its manufacture is more expensive. In this embodiment, the balls 9 and thus the borings 24 and the recesses 25 are arranged in the lower third of the coupling parts, and a spring 18 is also used in this embodiment. In this Example, the ring is rendered downwards gas tight by the joint ring 26.

As it can be seen in FIGS. 1 to 5 and understood from the foregoing description, the nature of the coupling between the apparatus and the hollow shaft, i.e. the stator, is completely independent of the kind of connection between both rotating parts, i.e. the driving means of the apparatus and the rotor of the equipment. FIG. 5 shows a coupling between two rotating parts where the driving means of the apparatus has a driving hole 28 with hexagonal section whereas the upper end 29 of the rotor shaft has a corresponding hexagonal driving pin so that a slip free coupling is obtained. The introduction of a hexagonal pin end into a hexagonal hole requires a careful operation and a relatively exact processing of both hexagonal parts.

Figure 3:
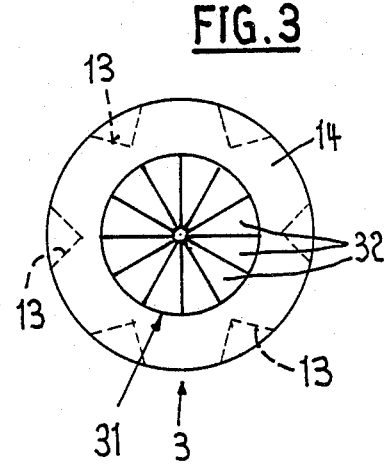
FIG. 3 shows a top view of the tubular shaft according to FIG. 1.
Figure 4:
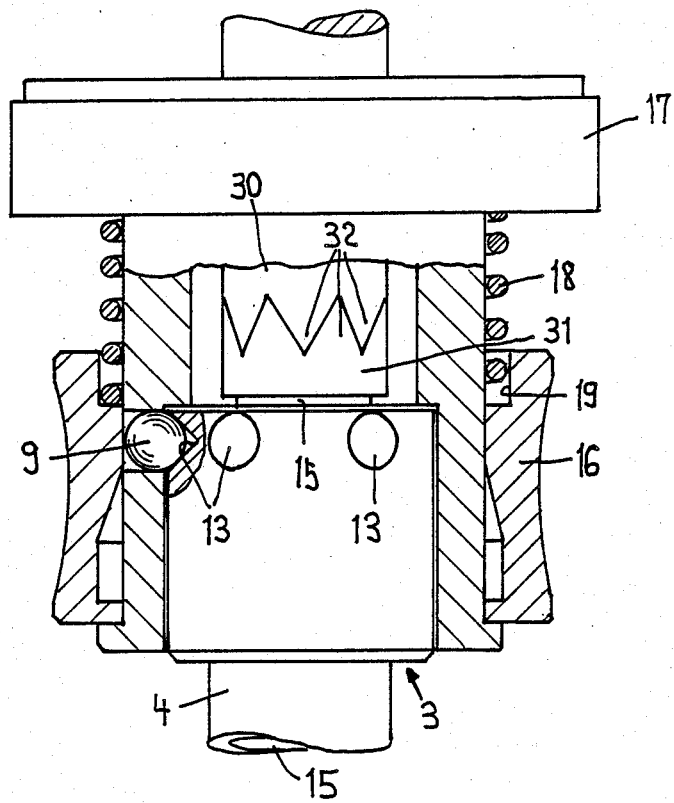
FIG. 4 shows a variant of the embodiment of FIG. 1, partly sectioned.

In looking for a further simplified insertion of the second coupling part and a better force transmission and power locking, the slip free connection according to FIGS. 1, 3, and 4 has been found. This coupling comprises the driving coupling part 30 and the coupling part 31 of the equipment. Both parts are processed to about identical shape. Each of both coupling parts 30 and 31 has six teeth 32. Each tooth 32 is provided with a flank of 60°. The use of six teeth with a slope of 60° allows an immediate insertion into the counterpiece without trial or rotation, and furthermore a maximal power transmission from the driving means to the rotor shaft. The driving piece 30 is preferably made of plastics and fixed to the driving shaft in such a manner that a predetermined rupture line 33 (FIG. 1) is formed which breaks on an overload of the rotor and protects the apparatus from superheating and further damage. The driving coupling part 30 of plastics is furthermore electrically insulating. The coupling part 31 of the equipment is of metal and is rigidly fixed to the rotor shaft and journalled together with the latter within the second coupling part 3.

The device of the invention is made of materials adapted to its purpose, generally of stainless steel, the second coupling part being preferably hardened.

What I claim:

1. A coupling device for coupling a shaft to an apparatus having a flange, comprising
    a first coupling part having
        a generally tubular connecting piece surrounding the shaft and having an inner wall, a top end, a bottom end adapted to support another member and at least two lateral bores having a width and a length, said connecting piece being connected to the flange at its top end,
    at least two balls having a diameter and being positioned in the bores, the width of the bores being slightly larger than the diameter of said balls and the length of the bores being slightly smaller than the diameter of said balls so that the balls, when in the bores, protrude from the bores into the interior of said connecting piece, and
    a generally cylindrical ring surrounding said connecting piece which rests on the bottom end of said connecting piece and extends above the bores, said ring being movable along said connecting piece and having a recessed lower inner portion adapted to partly receive said balls when said ring is raised off of the bottom end of said connecting piece, and
    a second coupling part surrounding said shaft having
        a generally tubular head lying along the inner wall of said connecting piece and having recesses adapted to receive said balls, and
        a generally tubular shaft positioned within and connected to said tubular head, said tubular shaft being journalled to said shaft.

2. A coupling device as in claim 1, wherein said connecting piece and said tubular head are substantially cylindrical in shape.

3. A coupling device as in claim 1, wherein said connecting piece has a substantially conical inner receiving surface and said tubular head has a substantially conical outer surface.

4. A coupling device as in claim 1, wherein said ring has an upper portion and a pressure spring is inserted between the flange and the upper portion of said ring.

5. A coupling device as in any of claim 1–4, wherein said connecting piece has three bores and said tubular head has six recesses adapted to receive said balls.

6. A coupling device according to claim 3 or claim 4, wherein said shaft comprises a driving means having a lower end with a substantially hexagonal recess and a rotor shaft having a substantially hexagonal driving head, said driving means being coupled to said rotor shaft by placing the driving head within the recess.

7. A shaft coupling comprising
    a driving shaft having an end,
    a driving coupling part connected to the end of said driving shaft,
    a rotor shaft having an end,
    a coupling part fixed to the end of said rotor shaft,
    said driving coupling part and said coupling part each having six teeth with a flank of 60 degrees and inserted, one into the other, so as to form a slip-free connection between the shafts.

8. A shaft coupling according to claim 7, wherein said driving coupling part is made of a plastic material and is fixed to the driving shaft in a manner so that a rupture line is formed, the rupture line being able to be broken when the rotor shaft is overloaded.

9. A coupling device for an apparatus having a flange, comprising
    a driving shaft having an end,
    a driving coupling part connected to the end of said driving shaft,
    a rotor shaft having an end,
    a coupling part fixed to the end of said rotor shaft,
        said driving coupling part and said coupling part each having six teeth with a flank of 60 degrees and inserted, one into the other, so as to form a slip-free connection between the shafts,
    a first coupling part having
        a generally tubular connecting piece surrounding the rotor and driving shafts and having an inner wall, a top end, a bottom end adapted to support another member and at least two lateral bores having a width and a length, said connecting piece being connected to the flange at its top end,
        at least two balls having a diameter and being positioned in the bores, the width of the bores being slightly larger than the diameter of said balls and the length of the bores being slightly smaller than the diameter of said balls so that the balls, when in the bores, protrude from the bores into the interior of said connecting piece, and a generally cylindrical ring surrounding said connecting piece which rests on the bottom end of said connecting piece and extends above the bores, said ring being movable along said connecting piece and having a recessed lower inner portion adapted to partly receive said balls when said ring is raised off of the bottom end of said connecting piece; and a second coupling part surrounding said rotor shaft having
 a generally tubular head lying along the inner wall of said connecting piece and having recesses adapted to receive said balls, and
 a generally tubular shaft positioned within and connected to said tubular head, said tubular shaft being journalled to said rotor shaft.

* * * * *